United States Patent [19]

Nash

[11] Patent Number: 5,181,594
[45] Date of Patent: Jan. 26, 1993

[54] CLUTCH ASSEMBLY

[75] Inventor: Ian A. Nash, Woodloes Park, England

[73] Assignee: Automotive Products plc, Leamington Spa, England

[21] Appl. No.: 817,355

[22] Filed: Jan. 6, 1992

[30] Foreign Application Priority Data

Jan. 18, 1991 [GB] United Kingdom ............... 9101180

[51] Int. Cl.⁵ .................... F16D 13/50; F16D 13/58
[52] U.S. Cl. ................................ 192/70.27; 192/89 B
[58] Field of Search ......................... 192/70.27, 89 B

[56] References Cited

U.S. PATENT DOCUMENTS

| 3,791,499 | 2/1974 | Ryan | 192/89 B X |
| 4,441,600 | 4/1984 | Caray | 192/70.27 X |
| 4,450,945 | 5/1984 | Caray | 192/70.27 X |
| 4,964,504 | 10/1090 | Friedmann | 192/89 B X |

FOREIGN PATENT DOCUMENTS

| 1317772 | 3/1962 | France | 192/89 B |
| 537927 | 7/1941 | United Kingdom . | |
| 0961405 | 6/1964 | United Kingdom . | |
| 1126911 | 9/1968 | United Kingdom . | |
| 1204539 | 9/1970 | United Kingdom . | |
| 1352989 | 5/1974 | United Kingdom . | |
| 1511745 | 7/1974 | United Kingdom . | |
| 1506738 | 4/1978 | United Kingdom . | |
| 1556970 | 12/1979 | United Kingdom . | |
| 2165321 | 4/1986 | United Kingdom | 192/89 B |

Primary Examiner—Rodney H. Bonck
Attorney, Agent, or Firm—Paul E. Milliken; Lee A. Germain

[57] ABSTRACT

A multiplate clutch assembly comprising a cover (10), drive plates (14), driven plates (16), diaphragm spring (20) and a fulcrum ring (24) located on the side of the spring away from the cover. The fulcrum ring (24) is a flat ring with an integral annular bead (31) in which the spring pivots with a plurality of integral spacers 26. The ring (24) is secured to the cover (10) by the spacers by a plurality of fasteners (28) each of which secures a single spacer to the cover.

7 Claims, 2 Drawing Sheets

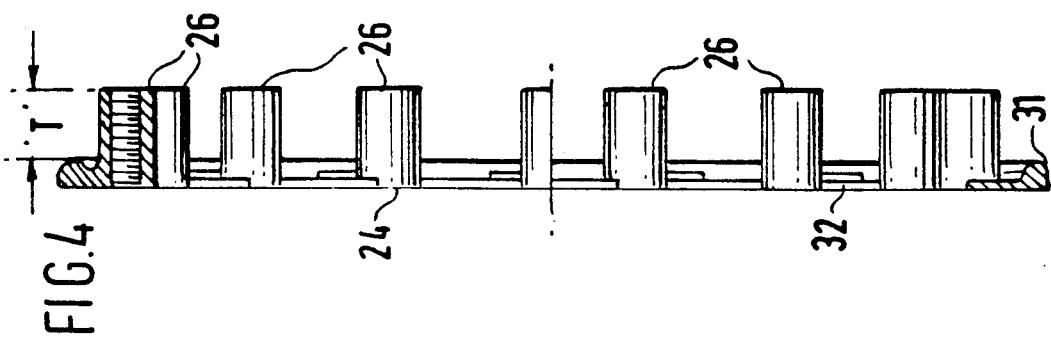
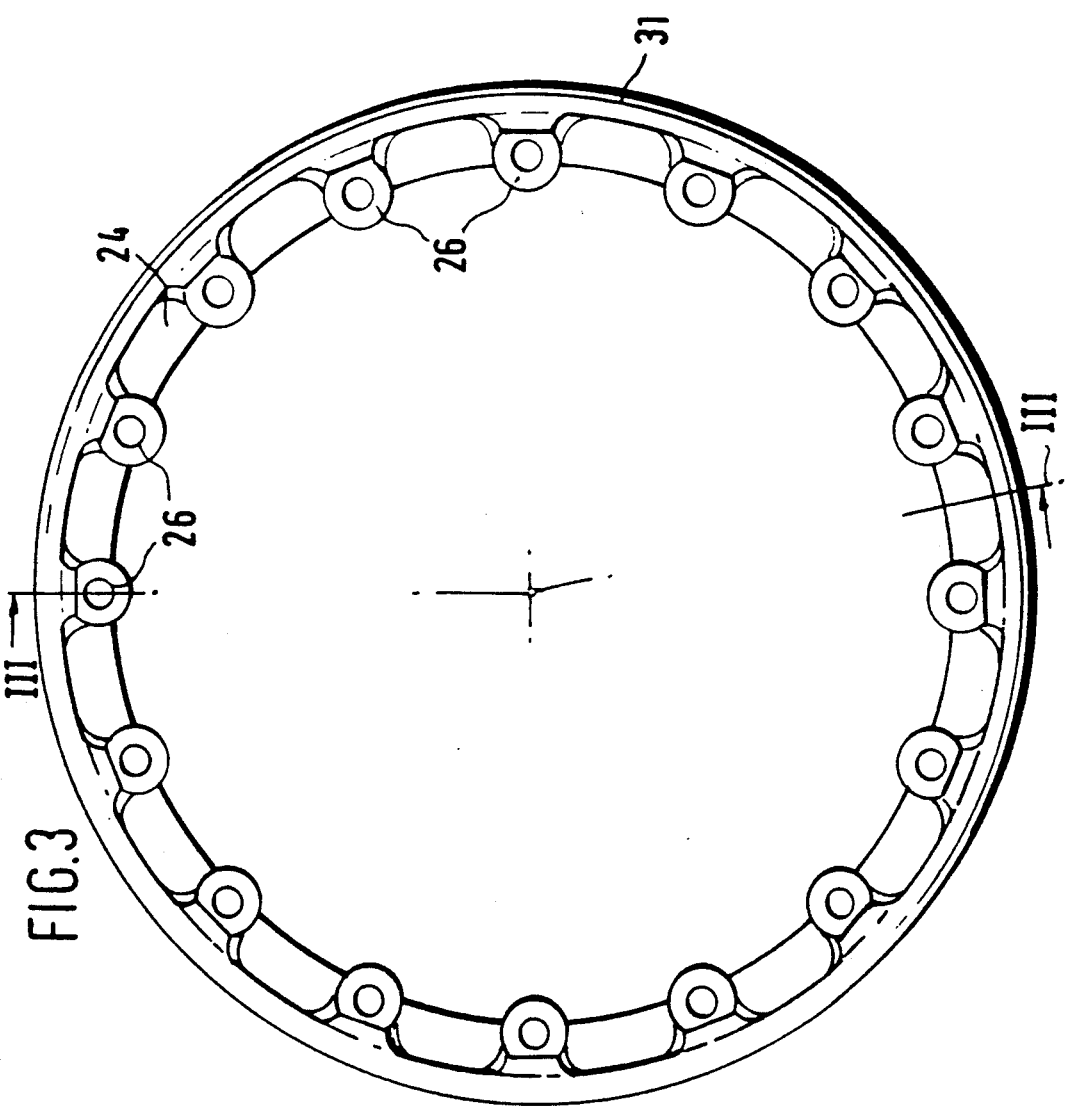

CLUTCH ASSEMBLY

The present invention concerns a multiplate clutch assembly, and more particularly a multiplate assembly for use on cars, and in particular but not exclusively, for use on racing cars.

BACKGROUND OF THE INVENTION

In racing cars a reduction in axial length of the overall clutch assembly is particularly important, especially in multi plate clutches. This is because space is at a premium in racing cars and any means whereby the overall length of the engine/gearbox assembly can be reduced significantly effects the construction of the vehicle.

SUMMARY OF THE INVENTION

The present invention provides a multiplate clutch assembly comprising a cover, a plurality of drive plates rotationally fast with the cover, a plurality of driven plates rotationally fast with a hub and located between the drive plates, a diaphragm spring, an annular fulcrum ring for pivotally supporting the diaphragm spring on its side away from the cover, and a plurality of spacers extending between the fulcrum ring and the cover, wherein the spacers are formed integrally with the fulcrum ring and the fulcrum ring is attached to the cover by a plurality of attaching members each securing one of the spacers to the cover.

Alternatively for a multiplate clutch, because the internal length of the fulcrum ring assembly has been reduced, the number of plates within the clutch assembly can be increased if desired.

DESCRIPTION OF THE DRAWINGS

Preferred embodiments of the present invention will now be described by way of example only with reference to the accompanying drawings in which

FIG. 3 is a plan view of a fulcrum ring; and

FIG. 4 is a section on line III—III through the fulcrum ring.

DESCRIPTION OF THE PREFERRED EMBODIMENTS

Figure 2:
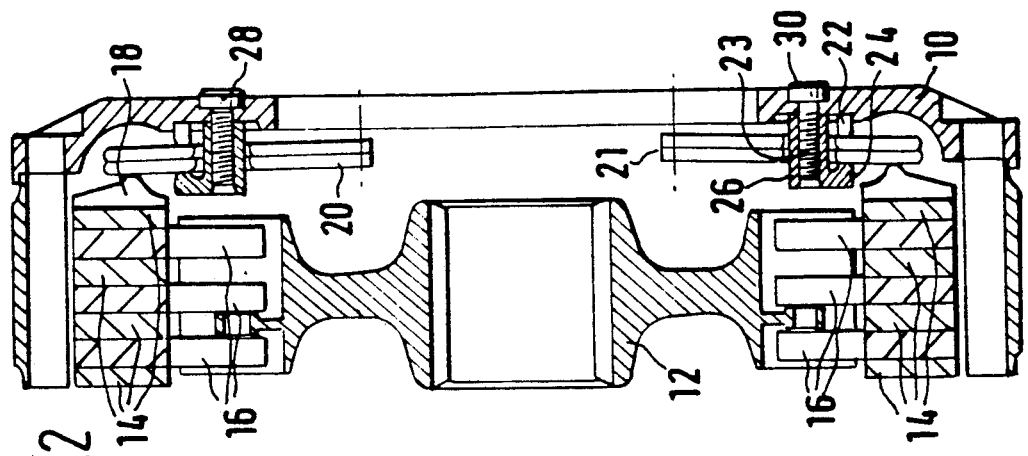
FIG. 2 is a section on line II—II of FIG. 1.
Figure 1:
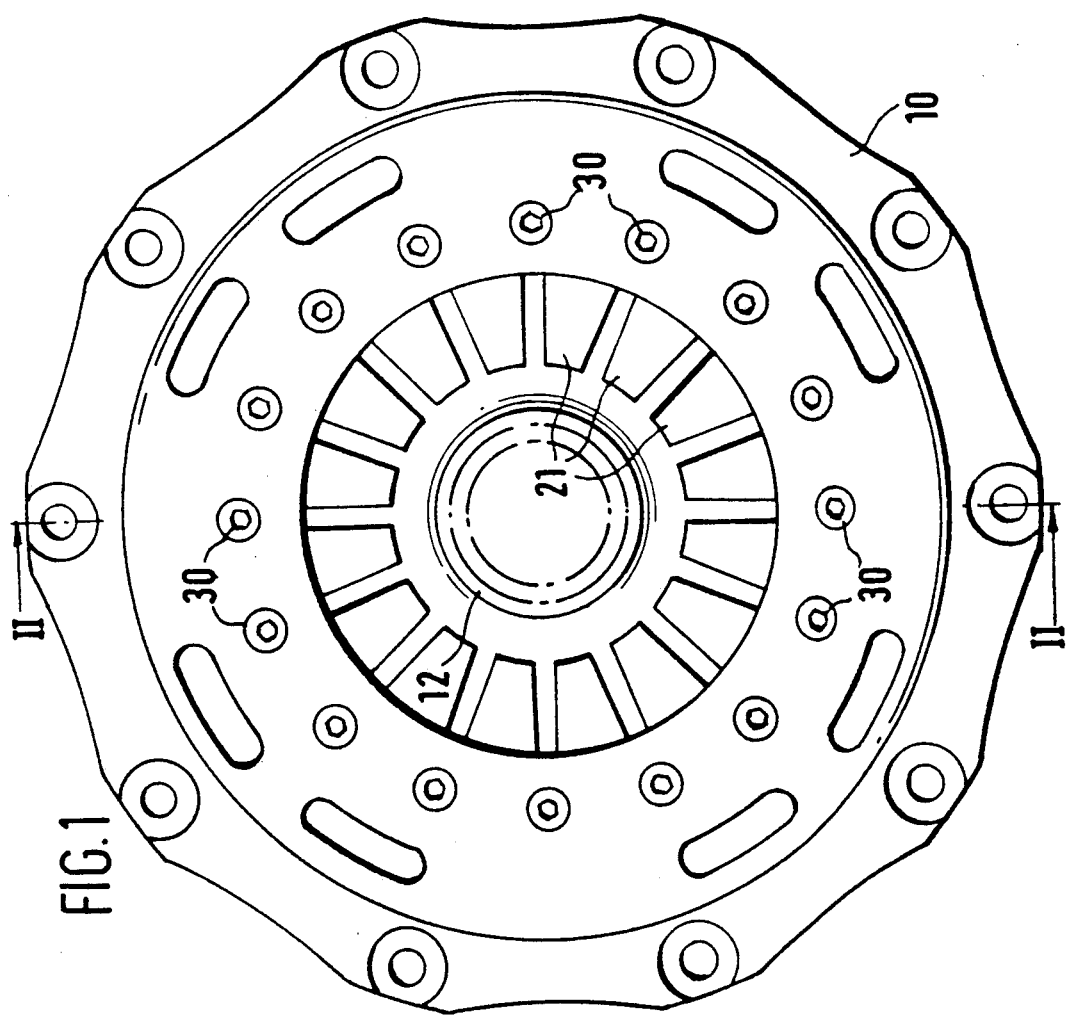
FIG. 1 is an elevation of a clutch cover assembly according to the invention.

A multiplate assembly, particularly of the type used in racing cars, comprises a cover 10 which in use is mounted on a flywheel (not shown) and a hub 12 mounted on a gearbox input shaft (not shown). Four annular drive plates are mounted on the cover 10 such that they can slide axially along it but are rotationally fast with it. Three annular driven plates 16 are mounted on the hub 12 such that they can slide axially along it but are rotationally fast with it. The drive plates 14 and the driven plates 16 overlap such that they can frictionally engage to transmit torque between the cover 10 and hub 12. The plates 14 and 16 are formed from a carbon-carbon composition.

A pressure plate 18 engages the drive plate furthest from the flywheel, and at least one diaphragm spring 20 is mounted on the cover such that it reacts between the cover 10 and the pressure plate 18 to urge the drive plates 14 and driven plates 16 towards the flywheel. In this case there are two diaphragm springs mounted one on top of the other. Each diaphragm spring 20 has an outer annular section having radially inwardly projecting spring fingers thereon. There are sixteen spring fingers 21 which are spaced circumferentially apart with apertures between adjacent pairs of spring fingers at the base of the spring fingers. The springs 20 are mounted on the cover 10 between a first fulcrum ring 22 which reacts against the cover and a second fulcrum ring 24 which is formed with sixteen integral spacers 26 which each pass through a respective aperture between the spring fingers and abut the cover 10. Each spacer 26 is held against the cover 10 by a readily detachable fastener 28. Each fastener is a setscrew or bolt comprising a head 30 and a shank 23 with a screw thread thereon. The screws 28 and the spacers 26 threadably engage one another and the shanks 24 are of such an axial length that they do not protrude axially beyond the spacers 26 towards the hub 12.

With reference to FIG. 3 and FIG. 4 there is illustrated a fulcrum ring 24 with integral spacers 26. Fulcrum ring 24 has a substantially flat annular ring base 32 with an integral annular bead 31 at its outer periphery which forms the pivot for the springs 20. The spacers 26 extend axially from the flat base 32.

Because the spacers 26 are integral with the ring 24 all the spacers can be easily machined to the same height. This gives a better control of the pivot height relative to the diaphragm spring when compared with prior art citations using separate spacers. Since the spacers are integral with the ring the tolerances on the components that make up the critical height 'T' between the top of the pivot and face of the spacers 26 are reduced to the tolerance of single dimension.

The screws 28 have heads 30 which are preferably countersunk into the cover 10 such that the screw heads 30 are least partially accommodated in the cover and are preferably substantially flush with the cover 10. This again helps reduce the overall axial dimensions of the clutch assembly.

Alternatively the spacers 26 may have screw threaded studs thereon that pass through the cover to engage nuts, which can be countersunk into the cover.

The construction of the clutch cover assembly described above enables simple assembly because the screws 28 are easy to insert, it results in a narrow assembly because the screws 28 do not extend beyond the cover 10 or the spacers 26, and the integral fulcrum and spacers 24,26 reduce manufacturing tolerances.

A clutch assembly according to the present invention may have overall length that is reduced by up to 10 mm when compared with prior art multi-plate clutch assembly.

I claim:

1. A motor vehicle multiplate clutch assembly comprising a cover, a plurality of drive plates rotationally fast with the cover, a plurality of driven plates rotationally fast with a hub and located between the drive plates, at least one diaphragm spring which acts to bias the drive plates into engagement with the driven plates, a first annular fulcrum ring on the cover for pivotally supporting the diaphragm spring on its side adjacent the cover, a second annular fulcrum ring aligned within the first fulcrum ring for pivotally supporting the diaphragm spring on its side away from the cover, and a plurality of spacers extending between the second fulcrum ring and the cover, wherein the spacers are formed integrally with the second fulcrum ring with the top faces of the spacers adjacent the cover machined to a predetermined height above the fulcrum ring, and the second fulcrum ring is attached to the cover by detachable attaching members each securing one of the spacers to the cover.

2. A clutch cover assembly according to claim 1 wherein each attaching member comprises a head and a shank and the shank thereof engages the respective spacer such that each attaching member shank extends axially along only a part of its respective spacer and does extend axially beyond said spacer.

3. A clutch cover assembly according to claim 2 wherein each attaching member detachably secures the second fulcrum ring and integral spacers to the cover.

4. A clutch cover assembly as claimed in claim 2, wherein each attaching member head is countersunk into the cover on its side away from its respective spacer, so that the head thereof is at least partially accommodated within the cover.

5. A clutch cover assembly as claimed in claim 1 wherein the annular second fulcrum ring has the pivot formed thereon as an integral annular bead.

6. A clutch cover assembly as claimed in claim 1 wherein the cover assembly includes two diaphragm springs assembled one on top of the other.

7. A clutch cover assembly as claimed in claim 1, wherein the diaphragm spring has a continuous outer annular portion with a plurality of inwardly projecting fingers which are spaced apart with an aperture between each pair of spring fingers at the base thereof, and the spacers of the fulcrum ring pass through the apertures between the spring fingers.

* * * * *